US 9,199,648 B2

(12) United States Patent
Bär

(10) Patent No.: US 9,199,648 B2
(45) Date of Patent: Dec. 1, 2015

(54) METHOD FOR OPERATING A MOTOR VEHICLE

(71) Applicant: Audi AG, Ingolstadt (DE)

(72) Inventor: Michael Bär, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 531 days.

(21) Appl. No.: 13/645,919

(22) Filed: Oct. 5, 2012

(65) Prior Publication Data

US 2013/0090840 A1    Apr. 11, 2013

(30) Foreign Application Priority Data

Oct. 6, 2011  (DE) .......................... 10 2011 114 972

(51) Int. Cl.
*G06F 19/00*  (2011.01)
*B60W 30/18* (2012.01)
*F02N 11/08*  (2006.01)
*B60W 10/06*  (2006.01)

(52) U.S. Cl.
CPC ..... *B60W 30/18154* (2013.01); *F02N 11/0837* (2013.01); *B60W 10/06* (2013.01); *B60W 2550/141* (2013.01); *B60W 2550/402* (2013.01); *F02N 2200/123* (2013.01); *F02N 2200/125* (2013.01); *Y02T 10/48* (2013.01)

(58) Field of Classification Search
CPC ....................................................... G06F 19/00
USPC ........................................................... 701/117
See application file for complete search history.

(56) References Cited

U.S. PATENT DOCUMENTS

| 7,079,940 | B2 * | 7/2006 | Scholt et al. ................... 701/112 |
| 7,689,331 | B2 * | 3/2010 | Moran .............................. 701/22 |
| 7,716,194 | B2 * | 5/2010 | Williams et al. .............. 707/705 |
| 8,145,376 | B2 * | 3/2012 | Sherony ........................... 701/23 |
| 2007/0112494 | A1 * | 5/2007 | Naik et al. ....................... 701/55 |
| 2008/0029318 | A1 * | 2/2008 | Proietty et al. ............... 180/65.2 |
| 2009/0216404 | A1 | 8/2009 | Maass |
| 2010/0211247 | A1 * | 8/2010 | Sherony .......................... 701/29 |

(Continued)

FOREIGN PATENT DOCUMENTS

| CN | 101548301 A | 9/2009 |
| DE | 101 39 595 | 2/2003 |

(Continued)

OTHER PUBLICATIONS

Chinese Search Report with respect to counterpart Chinese patent application 201210370907.8.

(Continued)

*Primary Examiner* — Mary Cheung
*Assistant Examiner* — Michael Berns
(74) *Attorney, Agent, or Firm* — Henry M. Feiereisen LLC

(57) ABSTRACT

In a method for operating a motor vehicle which includes a control device for automatically and driver independently switching at least one drive unit of the motor vehicle on or off at standstill, as a function of at least one item of position related road information which relates to the actual position of the motor vehicle on a road and the presence of at least one further boundary condition, only the at least one item of position related road information is determined and, when the at least one position related road information satisfies at least one road related criteria, the presence of the at least one further boundary condition is not queried.

10 Claims, 2 Drawing Sheets

(56) References Cited

U.S. PATENT DOCUMENTS

| | | | |
|---|---|---|---|
| 2011/0005486 A1* | 1/2011 | Nakamura | 123/179.4 |
| 2011/0082623 A1 | 4/2011 | Lu et al. | |
| 2011/0095909 A1 | 4/2011 | Kushi et al. | |

FOREIGN PATENT DOCUMENTS

| | | | |
|---|---|---|---|
| DE | 102008000131 | * | 7/2009 |
| DE | 102008041691 | | 3/2010 |
| DE | 102009010926 | | 9/2010 |
| DE | 102008011709 | | 2/2011 |
| DE | 102011005303 | | 9/2011 |
| EP | 2116984 A1 | | 11/2009 |
| JP | 2001-206237 A | | 7/2001 |

OTHER PUBLICATIONS

Translation of Chinese Search Report with respect to counterpart Chinese patent application 201210370907.8.

* cited by examiner

METHOD FOR OPERATING A MOTOR VEHICLE

CROSS-REFERENCES TO RELATED APPLICATIONS

This application claims the priority of German Patent Application, Serial No. 10 2011 114 972.8, filed Oct. 6, 2011, pursuant to 35 U.S.C. 119(a)-(d), the disclosure of which is incorporated herein by reference.

BACKGROUND OF THE INVENTION

The present invention relates to a method for operating a motor vehicle.

The following discussion of related art is provided to assist the reader in understanding the advantages of the invention, and is not to be construed as an admission that this related art is prior art to this invention.

It is known to equip modern motor vehicles with control devices for automatically and driver-independently, switch off at least one drive unit of the motor vehicle at standstill in order to save fuel. Usually, corresponding control devices cause a switching off of the drive unit, in particular of an internal combustion engine of the motor vehicle, when the motor vehicle comes to a standstill. In particular, it is possible that the control device causes the switching off of the drive unit in dependence on at least one item of road information which relates to the actual position of the motor vehicle on a road, and in dependence on the presence of at least one further boundary condition. Thus, the control device queries a plurality of boundary conditions which are relevant for regulation and for turning off the drive unit of the motor vehicle, such as for example the rotational speed of the engine, the rotational speed of the wheels etc., wherein the actual position of the motor vehicle on a road on which the motor vehicle drives can also be taken into account in the form of a position related item of road information.

Generally, the drive unit is reactivated or switched on via an input by the driver which indicates the he is ready to depart. Corresponding control devices are also referred to as so called start-stop automatic, or can be part of a corresponding start-stop automatic.

Switching the drive unit off via a corresponding control device is often disruptive, in particular for the driver when a particularly abrupt and speedy starting such as for example when driving into a roundabout from standstill or driving onto a speedway from standstill is required. This may even cause a safety risk for occupants of the motor vehicle and other road users because the control device allows a desired restarting of the motor vehicle from standstill with switched off drive unit only with a time delay, which is misjudged by the driver.

It would therefore be desirable and advantageous to provide a method for operating a motor vehicle which method is in particular improved with regard to regulating the driver independent switching off of the drive unit of the motor vehicle.

SUMMARY OF THE INVENTION

According to one aspect of the present invention, a method for operating a motor vehicle, includes the steps of determining at least one item of position related road information which relates to an actual position of the motor vehicle on a road, wherein a control device of the motor vehicle automatically and driver independently switches off a drive unit of the motor vehicle at standstill as a function of the at least one item of position related road information and at least one further boundary condition, and preventing a query whether the at least one boundary condition is established when the at least one item of position related information satisfies at least one road related criteria.

The method according to the invention thus enables switching the drive unit, in particular an internal combustion engine of a motor vehicle, on or off in adaption to the situation, wherein the position related information which relates to the actual position of the motor vehicle on a road, in particular the actual road, is used as central query criteria of the control device. In the course of the method according to the invention the position related road information is initially determined exclusively. The presence of further control relevant boundary conditions is queried only in situations in which the position related road information does not satisfy the at least one road related criteria, and thus the drive unit of the motor vehicle is switched off if needed. In cases in which the position related road information satisfies the at least one road related criteria, the query whether further boundary conditions are present is not carried out. Thus, the positional information which relates to the actual position of the motor vehicle on the road is compared with the road related criteria before any further measures are carried out which are required within context of the method according to the invention for automatically and driver independently switching off the drive unit, i.e. in particular, the query whether the at least one boundary condition is present.

A position related item of road information means in particular information which describes the actual position of the motor vehicle on a road, in particular the actual road. This requires on one hand, absolute position data of the motor vehicle, which can for example be determined via a GPS-signal, and on the other hand data relating to the respective road, which can be determined for example via a matching of a GPS-signal with map material which is stored in a memory. Thus, the position related road information can for example indicate at which position or on which section of the road the vehicle is actually located. Here, road specific information which relates to the further course of the (actual) road can be taken into account. In principle, the position related road information is thus based on a course of the road on which the motor vehicle actually drives, i.e., on the actual road. The position related road information thus represents the actual position of the motor vehicle on the actual road, thus actual position of the motor vehicle and the actual road are related to one another.

In particular it is possible that the position related road information represents the actual position of the motor vehicle on the road on which the motor vehicle actually drives i.e., the actual road, at high resolution or with high accuracy, so that the actual position of the motor vehicle is detectable on the actual road for example with an accuracy within the range of meters. Position related road information can be determined continuously or within predetermined or predeterminable time intervals, i.e. at predetermined or predeterminable time points.

Thus, by using the position related road information it is also possible, based on the actual position of the motor vehicle and by taking the further course of the actual road relative to the actual position into account, to determine at least one defined road situation or road constellation which lies ahead of this actual position at a defined distance. Concretely, the position related road information, based on the actual position of the motor vehicle on the actual road, can for example indicate that the motor vehicle is located at a defined distance to a further road which leads into the actual road, i.e., an intersection, access ramp and the like.

Within the context of the method according to the invention corresponding position related road information are compared with at least one road related criteria or matched. A road related criteria means in particular a defined road situation or road constellation such as for example intersections, entries or driveways into or from other roads, entries into roundabouts, entries onto speedways etc.

Thus, comparing the position related road information with the road related criteria allows for example to determine whether the motor vehicle is located directly at an entry into a roundabout, wherein in this case for example the road related criteria would be satisfied, or whether the motor vehicle (still) is located at such a sufficiently great distance to the entry into the roundabout at which the road related criteria is not (yet) satisfied. A further example for a road related criteria relates to the entry onto a speedway, wherein the criteria is satisfied for example when the position related road information indicates that the motor vehicle is located directly at the entry onto the speedway, and is correspondingly not satisfied when the position related road information indicates that the motor vehicle is (still) at a sufficiently great distance to the entry onto the speedway.

Thus, the road related criteria contains, in particular with regard to the actual road on which the vehicle actual drives defined, in particular upcoming, road situations or road constellations of the actual road. These are satisfied by the position related road information as soon as the motor vehicle reaches them or respectively approaches them up to a defined distance threshold value.

Thus, the road related criteria can also include a defined distance threshold range around a corresponding road situation and/or road constellation. It is therefore conceivable that the road related criteria is already satisfied when the motor vehicle is located at a predetermined or predeterminable distance to a defined upcoming road situation or road constellation. Concretely, the road related criteria can thus already be satisfied when the motor vehicle is located for example 5 m from an entryway into a roundabout. This can for example happen when the motor vehicle is located behind a further motor vehicle which stands directly in front to the entryway into the roundabout, i.e., at a defined distance to the entryway into the roundabout.

Thus, the road related criteria can also include a predetermined or predeterminable distance threshold value range to a defined road situation or road constellation in the sense of a distance corridor around the respective road situation or road constellation, wherein when this threshold value is reached or fallen below, the motor vehicle, and with this the position related road information, satisfies the road related criteria.

As mentioned, according to the invention, no query is carried out if the comparison of the position related road information with the road related criteria results in the road related criteria being satisfied. This means, the possibility of the automatic and driver-independent switching off of the drive unit of the motor vehicle at standstill is suppressed by the control device so long as the position related road information satisfies the, or at least one, road related criteria. Thus, the automatic and driver-independent switching off of the drive unit of the motor vehicle at standstill can be suppressed for example when the motor vehicle is located directly at a defined road situation or road constellation such as for example an entryway into a roundabout or at a defined distance or distance range to the defined road situation or road constellation. Because the drive unit is not automatically and driver-independently switched off at standstill of the motor vehicle within the context of the method according to the invention, it is possible for the driver to cause the vehicle to assume driving operation faster in a traffic situation which may require a quick starting of the motor vehicle, for example to quickly merge into the flowing traffic.

Thus, the motor vehicle can be restarted faster when the position related road information satisfies the road related criteria, i.e., essentially as in a motor vehicle without a corresponding control device for automatically and driver independently switching off the drive unit of the motor vehicle at standstill. Thus, it is possible with the method according to the invention to shorten the restarting process of the motor vehicle from standstill by valuable milliseconds or seconds by suppressing the automatic and driver independent switching off of the drive unit of the motor vehicle optionally, i.e., in defined road situations and/or road constellations in which the position related road information satisfies the road related criteria.

In a refinement of the invention it is possible that a road related criteria is used which describes at least one roundabout and/or an intersection which lie ahead of the actual road or the future road. Of course, a road related criteria can also include other road situations and/or road constellations. Examples for this are entryways from one road onto another road, such as in particular a speedway, or entryways from premises, parking lots or the like onto a driveway. Generally, the road related criteria thus reflect road situations and/or road situations in which traffic situations which require a fast starting of the motor vehicle from standstill can occur or regularly occur.

Expediently, a road related positional information can be used which describes a classification of the actual road. The classification of the position related road information enables a categorization or association of the actual road or actual road section on which the motor vehicle actually drives. It is conceivable that by means of the classification a road is classified to be located in-town or out of town, in particular as speedway. As described it is particularly useful to suppress the automatic and driver independent switching off of the drive unit of the motor vehicle at standstill when driving onto speedways, i.e., when standing at entries into speedways, such as country roads and highways etc. for a fast restarting. Within the context of the method according to the invention it is thus possible to take the classification of the actual road into account i.e., for example, to carry out the method according to the invention only outside of town, i.e., when an actual road is classified as out of town or when entering onto an actual road which is classified as out of town. It is also conceivable to classify defined roads as right of way roads or the like so that in the course of the classification of the actual road, certain traffic intrinsic road hierarchies can be observed.

It is possible to use predetermined criteria or criteria which are predeterminable by an operator. Thus, particularly road related criteria which are predetermined by the manufacturer can be used. The road related criteria can optionally be individually adjusted by an operator or driver. Thus it is conceivable that the operator or driver changes or modifies a set of road related criteria which are predetermined by the manufacturer. It is possible for the operator or driver to add further road related criteria or at least temporarily remove predetermined road related criteria so that the latter are not taken into account when carrying out the method according to the invention. This can be useful when the operator or driver considers it helpful to suppress the automatic and driver independent switching off of the drive unit of the motor vehicle when driving onto a busy road from his premises, because this makes it easier for him to merge into the flowing traffic.

Preferably, the at least one position related item of road information is determined via at least one position detection device which is configured as navigation device and/or as a vehicle sensor system which senses the vicinity of the motor vehicle, or via at least one position detection device which communicates with a corresponding navigation device and/or vehicle sensor system. A vehicle environmental sensor system means for example at least one radar sensor which senses the close and/or far area around the motor vehicle. In all named embodiments it is thus possible to determine high resolution or highly accurate actual positions of the motor vehicle on the actual road, thus enabling a highly accurate or high resolution display of the actual position of the motor vehicle on the actual road by means of a position related item of road information.

In addition, the invention relates to a motor vehicle, including a control device for automatically and driver independently switching a drive unit of the motor vehicle on or off at standstill, which control device causes a switching off of the drive unit in dependence on at least one item of road information which describes the actual position of the motor vehicle on a road as well as in dependence on the presence of at least one further boundary condition. The motor vehicle is configured for implementing the above described method according to the invention, therefore all explanations relating to the method according to the invention also apply to the motor vehicle according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
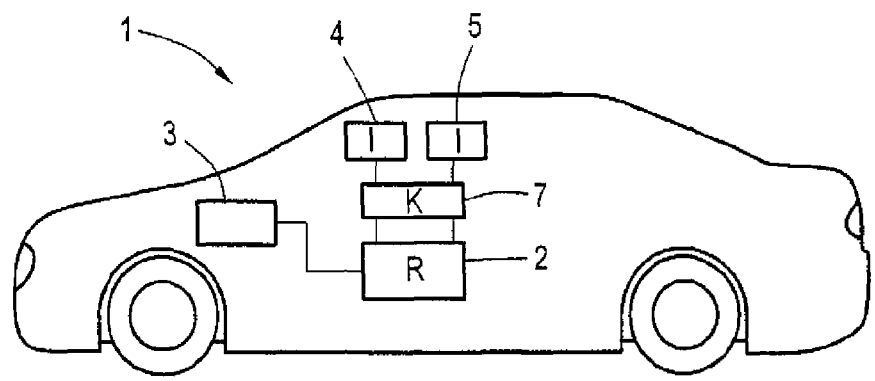
FIG. 1 shows a schematic representation of a motor vehicle according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic representation of a motor vehicle 1 according to the invention. The motor vehicle 1 includes a control device 2, referred to as start stop automatic, for automatically and driver independently switching the drive unit 3 of the motor vehicle 1 on or off at stand still, which drive unit 3 is configured in the form of an internal combustion engine. The control device 2 is thus configured to switch off the drive unit 3 in dependence on at least one item of position related road information I which describes the actual position of the motor vehicle 1 on a road F and in dependence on the presence of at least one further boundary condition R which for example means a defined time interval or the rotational speed of the drive unit 3 recorded during the standstill of the motor vehicle 1. For determining the position related road information I the control device communicates with a navigation device 4 which is provided in the vehicle and with a vehicle vicinity sensor 5 at the motor vehicle which sensor 5 is configured as radar sensor which senses the vicinity of the motor vehicle in the sense of a position detection device.

Figure 2:
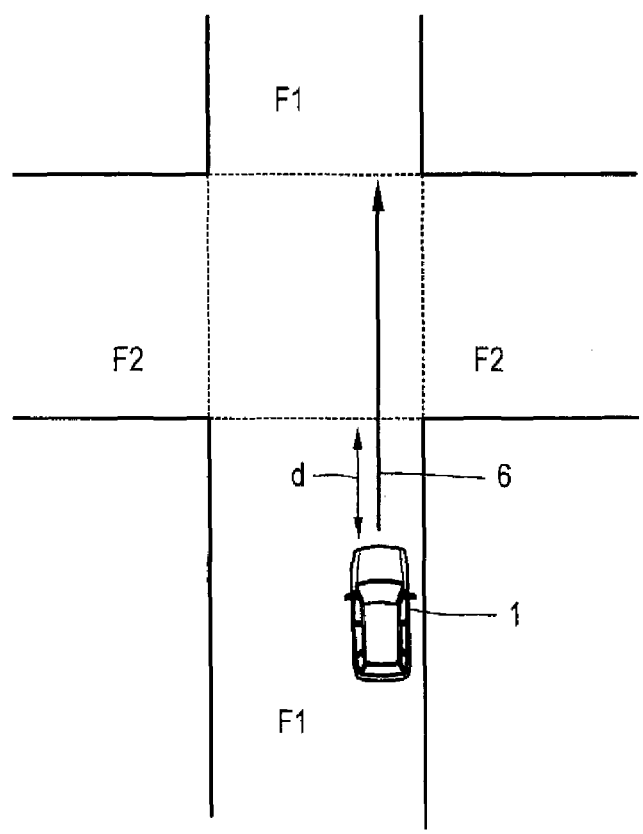
FIG. 2 shows the motor vehicle according to FIG. 1 in an exemplary road or traffic situation.
Figure 3:
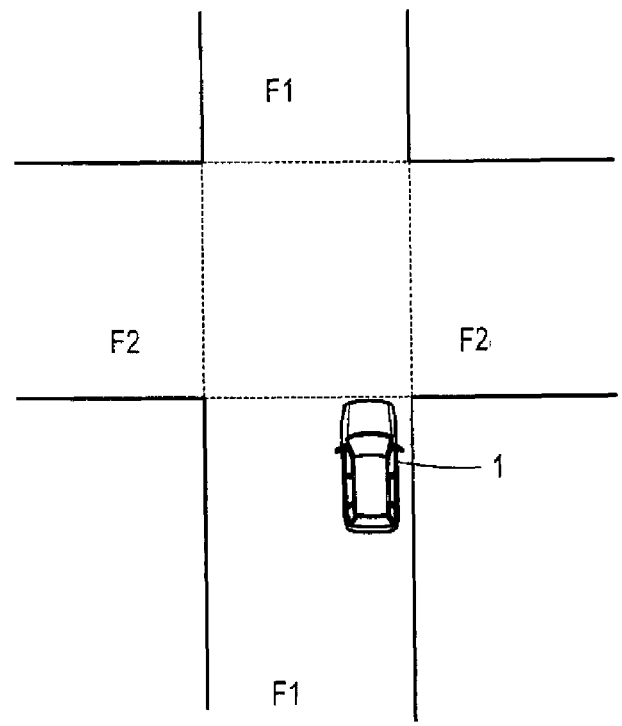
FIG. 3 shows the motor vehicle according to FIG. 1 in an exemplary road or traffic situation.
Figure 4:
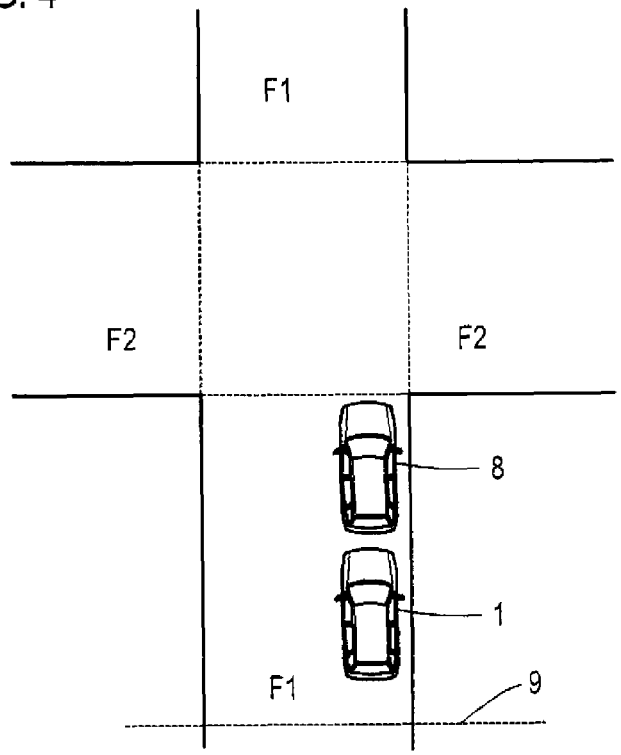
FIG. 4 shows the motor vehicle according to FIG. 1 in an exemplary road or traffic situation.

The method according to the invention is explained by way of the exemplary road or traffic situations shown in FIGS. 2-4. FIG. 2 shows the motor vehicle 1 according to FIG. 1 in an exemplary road or traffic situation. The motor vehicle moves on the road F1 which extends in the vertical direction in the direction of the arrow 6 in vertical direction upwards. It can be seen that the horizontally extending road F2 crosses the road F1, thus resulting in an intersection. The two roads F1 and F2 are generally to be understood as traffic roads. A similar road situation would result for example in an entry of the road F1 into a roundabout or when entering onto a driveway of a premise.

The position related road information I which is determined by means of the navigation device 4 and/or the vehicle vicinity sensors 5 therefore expresses that the motor vehicle is located at the shown position on the road F1. The road F1 can also be qualified i.e., it can be determined that it is a road within or outside a town. In FIG. 2 the road F2 is a right of way road, i.e., motor vehicles 1 present on the road F1 have to yield to motor vehicles present on the road F2.

The position related road information I is compared with at least one defined road related criteria K via a processing and/or calculation unit 7 which is provided for the motor vehicle and which can also represent a part of the control device 2. The road related criteria K can for example describe or include at least one intersection ahead (compare FIG. 2-4) on the actual road or future road which for example results from a route which is set in the navigation device 4.

In the road or traffic situation shown in FIG. 2, the motor vehicle 1 is located at a defined distance d to the intersection ahead. In the driving or traffic situation shown in FIG. 3, the motor vehicle 1 stands directly at the intersection. The driver intends to cross the intersection and to continue his drive on the road F1 in the direction of the arrow 6. The actual position of the motor vehicle 1 on the road F1 which is now changed compared to FIG. 2 is again determined in the form of a position related item of road information I. The position related item of road information is compared to a corresponding road related criteria K, which for example describes an intersection. All road related criteria are contained in a memory (not shown) which is assigned to the processing and/or calculation unit 7. The road related criteria K can be predetermined in particular by the manufacturer or be predetermined or individually adjusted by a driver or operator.

Thus, the position related item of information I in the situation shown in FIG. 3 satisfies the criteria K which describes an intersection so that a query of the presence of further boundary conditions R does not occur. Accordingly, the automatic and driver independent switching off of the drive unit of the motor vehicle 1 is temporarily suppressed when the motor vehicle 1 has to be decelerated to a standstill in response to the traffic situation as is the case in FIG. 3. The function of the control device 2 is thus temporarily deactivated, the drive unit 3 of the motor vehicle 1 continues to be active in the road or traffic situation shown in FIG. 3. Thus the motor vehicle 1 can be moved across the intersection without the time delay caused by the reactivation or restarting of the drive unit, so that the driver is enabled to cross the intersection faster and as the case may be safer owing to a fast restarting.

The exemplary driving or traffic situations shown in FIG. 4 show that the road related criteria K can also already be satisfied when the motor vehicle approaches the intersection, which approach is in turn detected and expressed by position related road information. In FIG. 4 a further motor vehicle 8 which stands directly at the intersections, is located in front of the motor vehicle 1. Likewise, the road related criteria K is satisfied by the position related road information I in the road or traffic situation shown in FIG. 4. Here, the criteria K which describes the intersection, includes a distance threshold value or distance range to the intersection (compare hatched line 9). Thus, the criteria K is satisfied for all actual positions of the motor vehicle 1 on the road F1 within the distance corridor defined between the intersection and the line 9. This means the query of the presence of further boundary conditions R and thus an automatic and driver independent switching off of the drive unit 3 of the motor vehicle 1 at standstill is suppressed at all positions of the motor vehicle within the corridor. The drive unit 3 is thus not switched off.

As a result, when the motor vehicle 8 which is located in front of the motor vehicle 1 enters the intersection crosses the intersection and turns left or right onto the road F2, the motor vehicle 1 can quickly cross the intersection if the latter is clear, wherein the drive unit 3 does not have to be restarted in spite of the intermittent standstill of the motor vehicle. In this way fast and safe restarting processes of the motor vehicle are also possible in traffic situations which correspond to the one shown in FIG. 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for operating a motor vehicle, comprising the steps of:
   determining at least one item of position related road information which relates to an actual position of the motor vehicle on a road, wherein a control device of the motor vehicle automatically and driver independently switches off a drive unit of the motor vehicle at standstill as a function of the at least one item of position related road information and at least one boundary condition; and
   preventing a query whether the at least one boundary condition is established when the at least one item of position related road information satisfies at least one road related criterion,
   wherein the at least one item of position related road information includes information which describes a classification of the road on which the motor vehicle is actually located, and
   wherein a road is classified as in-town or out-of-town as a function of the at least one item of position related road information.

2. The method of to claim 1, wherein the at least one road related criterion describes a roundabout and/or an intersection which lies ahead on a road on which the motor vehicle is actually located or on a future road.

3. The method of claim 1, wherein the at least one road related criterion are determined or determinable by an operator.

4. The method of claim 1, wherein the at least one item of position related road information is determined via at least one position determining device which is configured as a navigation device and/or as an environmental sensor of the vehicle or via at least one position determining device for communicating with the navigation device and/or with the environmental sensor of the vehicle.

5. A method for operating a motor vehicle, comprising the steps of:
   determining at least one item of position related road information which relates to an actual position of the motor vehicle on a road, wherein a control device of the motor vehicle automatically and driver independently switches off a drive unit of the motor vehicle at standstill as a function of the at least one item of position related road information and at least one boundary condition; and
   preventing a query whether the at least one boundary condition is established when the at least one item of position related road information satisfies at least one road related criterion,
   wherein the at least one item of position related road information includes information which describes a classification of the road on which the motor vehicle is actually located, and
   wherein a road is classified as a highway as a function of the at least one item of position related road information.

6. The method of claim 5, wherein the at least one road related criterion describes a roundabout and/or an intersection which lies ahead on a road on which the motor vehicle is actually located or on a future road.

7. The method of claim 5, wherein the at least one road related criterion is determined or determinable by an operator.

8. The method of claim 5, wherein the at least one item of position related road information is determined via at least one position determining device which is configured as a navigation device and/or as an environmental sensor of the vehicle or via at least one position determining device for communicating with the navigation device and/or with the environmental sensor of the vehicle.

9. A motor vehicle comprising:
   at least one drive unit;
   a sensor determining at least one item of position related road information which relates to an actual position of the motor vehicle on a road;
   a control device for automatically and driver independently switching the at least one drive unit on or off at a standstill of the motor vehicle as a function of the at least one item of position related road information and at least one boundary condition said control device being configured to prevent a query whether the at least one boundary, condition is established when the at least one item of position related road information satisfies at least one road related criterion,
   wherein the at least one item of position related road information includes information which describes a classification of the road on which the motor vehicle is actually located, and
   wherein a road is classified as a highway as a function of the at least one item of position related road information.

10. A motor vehicle, comprising: at least one drive unit;
    a sensor determining at least one item of position related road information which relates to an actual position of the motor vehicle on a road;

a control device for automatically and driver independently switching the at least one drive unit on or off at a standstill of the motor vehicle as a function of the at least one item of position related road information and at least one boundary condition said control device being configured to prevent a query whether the at least one boundary condition is established when the at least one item of position related road information satisfies at least one road related criterion, wherein the at least one item of position related road information includes information which describes a classification of the road on which the motor vehicle is actually located, and wherein a road is classified as a highway as a function of the at least one item of position related road information.

* * * * *